United States Patent [19]

Mehra et al.

[11] Patent Number: 4,614,585
[45] Date of Patent: Sep. 30, 1986

[54] FRANGIBLE BONDED DISPOSABLE FILTRATION UNIT WITH RECOVERABLE FILTER

[75] Inventors: Ravinder C. Mehra, Fairport; Robert G. Relyea, Canandaigua; Peter K. Baird, Fairport, all of N.Y.

[73] Assignee: Sybron Corporation, Rochester, N.Y.

[21] Appl. No.: 649,974

[22] Filed: Sep. 12, 1984

Related U.S. Application Data

[63] Continuation of Ser. No. 459,712, Jan. 21, 1983, abandoned, which is a continuation of Ser. No. 238,152, Mar. 2, 1981, abandoned.

[51] Int. Cl.$^4$ ............................................. B01D 31/00
[52] U.S. Cl. .................................. 210/433.2; 210/445; 210/450; 210/451; 210/455
[58] Field of Search .............. 210/232, 236, 238, 321, 210/433, 445, 450, 451, 455, 472, 474; 55/480, 502, 503; 220/23.83, 23.86, 20.5, 266, 276; 422/101; 459/712

[56] References Cited

U.S. PATENT DOCUMENTS

| | | | |
|---|---|---|---|
| 1,577,088 | 3/1926 | Williston | 210/445 |
| 1,982,567 | 11/1934 | Blanchard | 220/266 X |
| 3,085,689 | 4/1963 | Hering et al. | 210/232 |
| 3,295,686 | 1/1967 | Krueger | 210/455 |
| 4,035,294 | 7/1977 | Landers et al. | 210/780 |
| 4,225,440 | 9/1980 | Pitesky | 210/451 X |

*Primary Examiner*—David Sadowski
*Attorney, Agent, or Firm*—Frank Pincelli

[57] ABSTRACT

A disposable filtration unit having a breakaway reservoir to facilitate recovery of the filter membrane.

5 Claims, 4 Drawing Figures

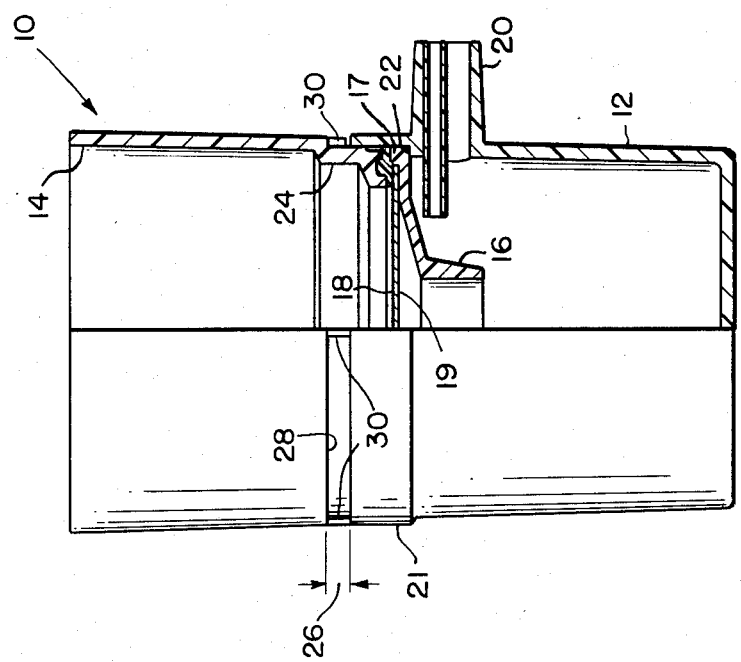
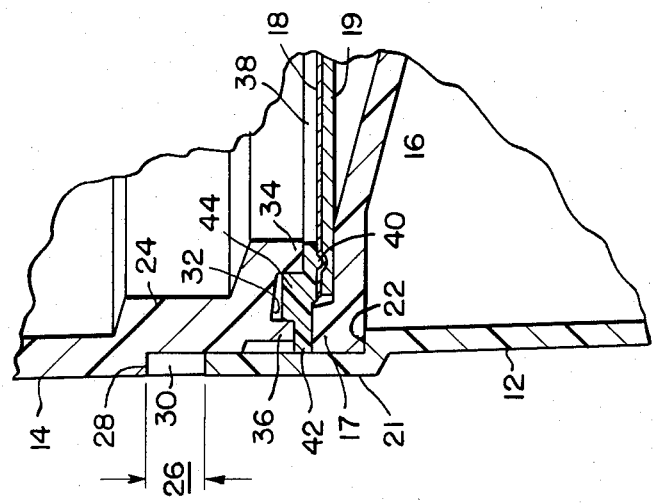
FIG. 1
FIG. 2

FRANGIBLE BONDED DISPOSABLE FILTRATION UNIT WITH RECOVERABLE FILTER

This application is a continuation of application Ser. No. 459,712 filed Jan. 21, 1983, which is a continuation of application Ser. No. 238,152 filed Mar. 2, 1981, both are now abandoned.

BACKGROUND

The present invention relates generally to a disposable filtration unit as may be used for laboratory work and the like. In particular the present invention relates to such a filter wherein the filter medium is quickly and easily recoverable.

Disposable filtration units are well known in the art. One such unit for example is identified in U.S. Pat. No. 3,295,686. Generally the unit described in this patent is a disposable filter which is supplied to the user in a sterile package ready for use wherein the filter membrane is sandwiched between component parts of the unit. These component parts are permanently fixed together as by cementing or ultrasonic welding so that an airtight seal is formed about the periphery which prevents leakage of air into the unit at a point downstream of the filter.

Other disposable units have the filter membrane permanently afixed by cementing or by sonic welding to one element of the unit.

While such units are appropriate in cases where the user is interested in recovering the filtrate, such units are not suitable in cases where the user is interested in recovering the material filtered from the liquid. In this respect the construction of disposable units of the prior art does not facilitate removal of the filter sheet. With these prior art units, attempts to recover the filter sheet often result in a destruction of the filter sheet and the loss of some of the material which the user desires to recover.

SUMMARY OF THE INVENTION

The present invention may be characterized in one aspect thereof by the provision of a receptacle for receiving the filtrate and a hollow open-ended shell joined to the receptacle by a breakaway connection. Sandwiched between the shell and the receptacle is a support plate and a filter membrane wherein one end of the hollow shell clamps the filter membrane to the support plate so that when the shell is broken away from the receptacle, the filter membrane can be lifted off of the support plate. A gasket between the shell and support plate effects an airtight seal which prevents the leakage of air into the receptacle downstream from the filter membrane. The gasket and shell also cooperate so that the gasket is removed together with the shell.

DESCRIPTION OF THE DRAWINGS

FIG. 1 is a side elevation view partly broken away and in section showing the disposable filter unit of the present invention;

FIG. 2 is a view on an enlarged scale showing a portion of the filtration unit.

DESCRIPTION OF THE PREFERRED EMBODIMENT

Figure 4:
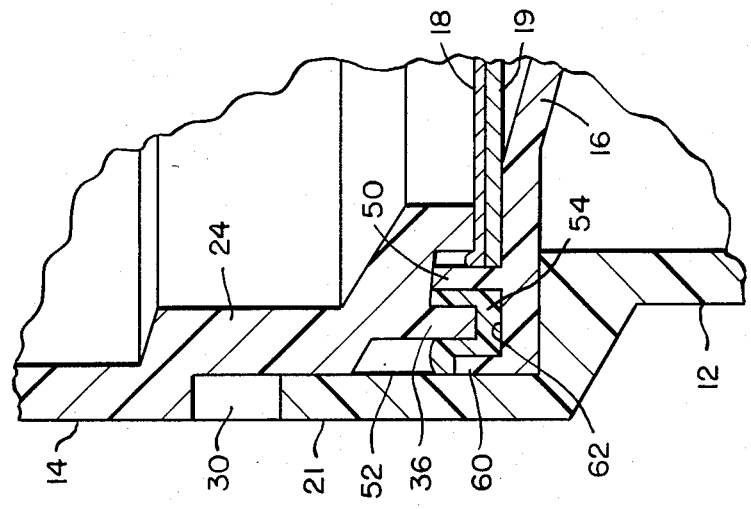
FIGS. 3 and 4 are views similar to FIG. 2 only showing other embodiments of the invention.

Referring to the drawings, FIG. 1 shows the disposable filtration unit of the present invention generally indicated at 10 as including a lower cup-shaped receptacle 12 for receiving the filtrate and an upper open-ended hollow shell 14 for receiving the liquid to be filtered. The receptacle has a spout 20 which serves both as a connector for attachment of a vacuum line and as a pouring spout for filtrate received into the receptacle.

Disposed between the shell and receptacle is a generally funnel shaped support plate 16. The support plate 16 has an upstanding outer rim 17 which surrounds a sheet of filter material 18 and a support pad 19 laid on the support plate (FIG. 2).

As shown in FIGS. 1 and 2, the upper end of the receptacle 12 has a rim 21 which forms an internal shoulder 22. Support plate 16 is carried on this shoulder as a customary in the art. The support plate can be permanently attached to the receptacle by a suitable cement or by ultrasonic welding to provide an airtight connection between the receptacle and support plate.

The lower end of shell 14 has a necked portion 24 so that it can be received into receptacle rim 21. The axial length of necked portion 24 and its position within rim 21 is such that there is some axial distance, indicated at 26, between the top of the receptacle rim and an edge 28 of the necked portion.

Formed integral shell 14 at spaced intervals about the necked portion are a plurality of vertical ribs 30. The length of these ribs are sufficient to bridge the distance 26 as shown in FIG. 1. These ribs can be attached to the upper end of receptacle rim 21 by any suitable means such as ultrasonic welding so as to fix shell 14 to the receptacle. Because the attachment of ribs 30 to the receptacle occurs only at spaced intervals about the periphery of the receptacle, it should be appreciated that these ribs 30 provide weak "breakaway" points so as to facilitate removal of the shell from the receptacle.

FIG. 2 shows in greater detail the connection between the breakaway shell and the receptacle. The lower and face of shell 14 is bifurcate, having a groove 32 which divides the lower end of the shell into an inner foot 34 and an outer foot 36 for purposes explained hereinbelow.

Disposed between the lower end face of shell 14 and support plate 16 is a flat, annular gasket 38. The inner periphery of this gasket overlies the filter membrane and the outer periphery rests on the support plate rim 17. The gasket is pressed against rim 17 of the support plate 16 and against filter membrane 18 by the bifurcate lower end of shell 14. In this way the gasket provides two seals. The first seal is a liquid tight seal between shell 14 and filter membrane 18 which prevents liquid in the reservoir from being drawn around and beneath the edge of the filter membrane and into receptacle 12. This first seal is made more effective by an annular rib 40 on the gasket which is pressed into and against the filter membrane 18 by the inner foot 34 of shell 14.

The second seal is an air tight seal between shell 14 and support plate 16 which prevents air from being drawn under the outer edge of the gasket. This second seal is made effective by having the outer foot 36 of the shell pressing the outer periphery 42 of the gasket against the rim 17 of the support plate.

Between the gasket rib 40 and the outer periphery 42 of the gasket, is an upstanding band 44 of gasket material. This upstanding band is received in groove 32 and is slightly wider than the groove as to provide an interference fit. With this arrangement the gasket 18 is interlocked with shell and will remain attached to the shell when the shell is broken away and removed from receptacle 12.

To manufacture the filtration unit of the present invention the separate components, namely the receptacle 12, shell 14 and support plate 16, are separately molded as by injection molding and are made of a synthetic resin or plastic material. Gasket 38 is also molded from an appropriate gasket material such as thermoplastic elastomer or silicone rubber. Support plate 16 is then attached to the receptacle and against shoulder 22 by cementing, sonic welding or other suitable means. Thereafter, the filter membrane 18 and, if desired, the pad 19 are placed on support plate 16. The shell, with gasket 38 already attached to the lower end of the shell, is then placed in position by inserting the necked portion 24 of the shell into the receptacle rim 21. This simultaneously clamps the filter sheet to the support plate and compresses the gasket material to effect the two seals as described above. With the shell held in this position ribs 30 are attached as by sonic welding to the upstanding end of the receptacle rim 21.

In use the liquid to be filtered is simply poured into the hollow shell 14 and the filtrate collected in receptacle 12. If desired air can be evacuated from the receptacle to speed the filtration process by attaching a vacuum line to spout 20. After the liquid has been filtered the hollow shell is simply broken away from the receptacle, the attachment of ribs 30 to the receptacle being weak, "breakaway" points which makes it easy to remove the shell from the receptacle. Due to the interference fit between the band 44 of gasket material and groove 32 in the end face of shell 14, the gasket 38 is held to the shell and is removed together with the shell to expose the filter sheet 18. With the shell and gasket removed, the filter membrane 18 can be lifted off of the support pad in order to collect or work on the materials filtered from the liquid.

Figure 3:
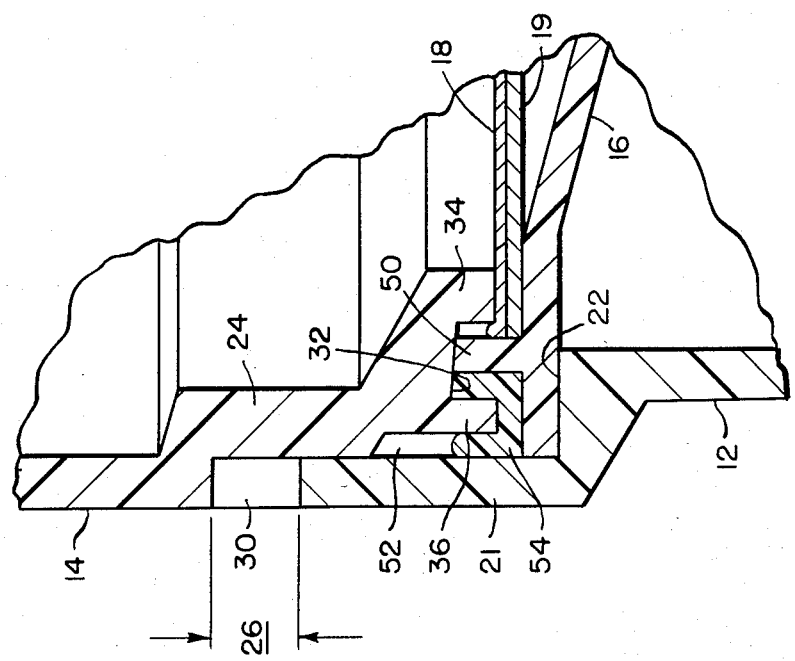

Alternative forms of the invention are shown in FIGS. 3 and 4, it being understood that parts similar to those shown in FIGS. 1 and 2 are identified with the same reference numeral. In the embodiments shown in FIGS. 3 and 4, the support plate 16 takes a slightly different form to accommodate an alternative sealing arrangement which does not utilize a formed gasket 38 as shown in the preferred embodiment of FIGS. 1 and 2.

FIG. 3 shows that support plate 16 has an upstanding tongue 50 spaced radially inward from receptacle rim 21 so the rim and tongue 50 define a space 52 therebetween. Prior to the assembly of shell 14 to the receptacle, a suitable liquid gasket material 54 such as an RTV Silicone or the like is put into space 52.

Upon assembly of the shell to the receptacle, tongue 50 is received into the groove 32 so that the outer foot 36 of the receptacle extends into the gasket material 54. This displaces sufficient gasket material so that an airtight seal is formed between the shell and support plate which prevents air leaking into the receptacle downstream from filter membrane 18.

The inner foot 34 of the shell presses directly on filter membrane 18 to clamp its periphery to support plate 16.

An alternative construction is shown in FIG. 4. In this embodiment the support plate 16 has an upstanding peripheral lip 60 in addition to tongue 50. Lip 60 and tongue 50 define the sidewalls of a channel 62 for receiving the gasket material. It should be appreciated that in this embodiment tongue 50 is higher than lip 60. This ensures that when the shell is attached to the receptacle the gasket material is not squeezed around tongue 50 so as to contact the filter sheet 18. Instead, the gasket material is squeezed over the lower lip 60 and into the space 52 between the necked portion 24 of the shell and the receptacle rim 21. In the absence of lip 60 as shown in the FIG. 4 embodiment, gasket material 54 simply is squeezed around the outer foot 36 of the shell and into the space between the necked portion of the shell and the receptacle rim.

Thus, it should be appreciated that the present invention provides a filter unit which permits easy recovery of the filter membrane. The unit is easily manufactured and designed to be a one-use disposable item in that the separation of the shell from the receptacle at the "breakaway" points prevents reuse of the unit.

Having thus described the invention in detail what is claimed as new is:

1. A disposable filtration unit having a recoverable filter membrane comprising:
   (a) a hollow cylindrical receptacle for receiving a filtrate, said receptacle having an upper rim portion defining an internal shoulder;
   (b) a support plate fixed to said shoulder, said plate having at least one opening therethrough;
   (c) a filter membrane removably disposed upon said support plate over said at least one opening;
   (d) an annular gasket overlying said filter membrane and support plate;
   (e) a hollow cylindrical shell for receiving a liquid to be filtered, said shell having an outer periphery and a lower neck portion extending into the rim portion of said receptacle, a lower end face of said neck portion pressing said gasket into sealing engagement with said support plate and filter membrane, said shell being removably attached to said receptacle by discrete frangible bonds located at spaced intervals about the outer periphery of said shell and said upper rim portion of said receptacle and being integrally formed between said outer periphery of said shell and an upper end of said rim portion of said receptacle, said bonds being the sole points of attachment between the shell and the receptacle.

2. The disposable filtration unit of claim 1, wherein said gasket is attached to said shell for simultaneous removal therewith.

3. The disposable filtration unit of claim 1, wherein said gasket defines an upper surface, the neck portion of said shell includes a groove formed in said lower end face thereof, and wherein said gasket includes a projection from said upper surface, said projection being interlocked with said groove so that said gasket remains attached to said shell when the shell is removed from the receptacle.

4. A disposable filtration unit as in claim 3, wherein the lower end face of said neck portion has an inner foot and an outer foot which define said groove, and wherein:
   (a) said support plate includes a tongue, said tongue being received in said groove, said tongue and receptacle defining an annular space therebetween;
   (b) said gasket being in said annular space; and
   (c) said outer foot extending into said annular space and sealingly engaging said gasket.

5. A disposable filtration unit as in claim 4, wherein said support plate includes an upstanding lip spaced outward from said tongue, said lip and tongue defining a channel therebetween for receiving said gasket, said outer foot extending into said channel and sealingly engaging said gasket.

* * * * *